(12) United States Patent
Bolger et al.

(10) Patent No.: US 11,964,568 B2
(45) Date of Patent: Apr. 23, 2024

(54) CONTROL OF ACCELERATOR LIFT-PEDAL DECELERATION IN AN ELECTRIC VEHICLE

(71) Applicant: FORD GLOBAL TECHNOLOGIES, LLC, Dearborn, MI (US)

(72) Inventors: Bryan Michael Bolger, Canton, MI (US); Sergey Gennadievich Semenov, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 542 days.

(21) Appl. No.: 17/014,560

(22) Filed: Sep. 8, 2020

(65) Prior Publication Data
US 2022/0072961 A1 Mar. 10, 2022

(51) Int. Cl.
*B60L 15/20* (2006.01)
*B60L 7/18* (2006.01)

(52) U.S. Cl.
CPC ............. *B60L 15/2009* (2013.01); *B60L 7/18* (2013.01)

(58) Field of Classification Search
None
See application file for complete search history.

(56) References Cited

U.S. PATENT DOCUMENTS

| | | | |
|---|---|---|---|
| 6,378,636 B1 | 4/2002 | Worrel et al. | |
| 9,738,268 B1 | 8/2017 | Zhang et al. | |
| 9,849,786 B2 | 12/2017 | Miller et al. | |
| 2007/0173372 A1* | 7/2007 | Ueno | B60L 7/26 477/3 |
| 2007/0187158 A1* | 8/2007 | Muta | B60K 28/16 180/197 |
| 2017/0355361 A1* | 12/2017 | Yamazaki | B60K 6/28 |

* cited by examiner

*Primary Examiner* — Todd Melton
*Assistant Examiner* — Jason R Roberson
(74) *Attorney, Agent, or Firm* — David B. Kelley; Brooks Kushman P.C.

(57) ABSTRACT

A vehicle includes a controller programmed to generate a command to an electric machine to reduce a torque output rate after an accelerator pedal is tipped out based upon a vehicle speed value and a wheel acceleration torque value. The torque output rate is initially reduced at a first rate, and is then reduced at a second rate slower than the first rate when the wheel acceleration torque value is greater than 0 Nm.

8 Claims, 7 Drawing Sheets

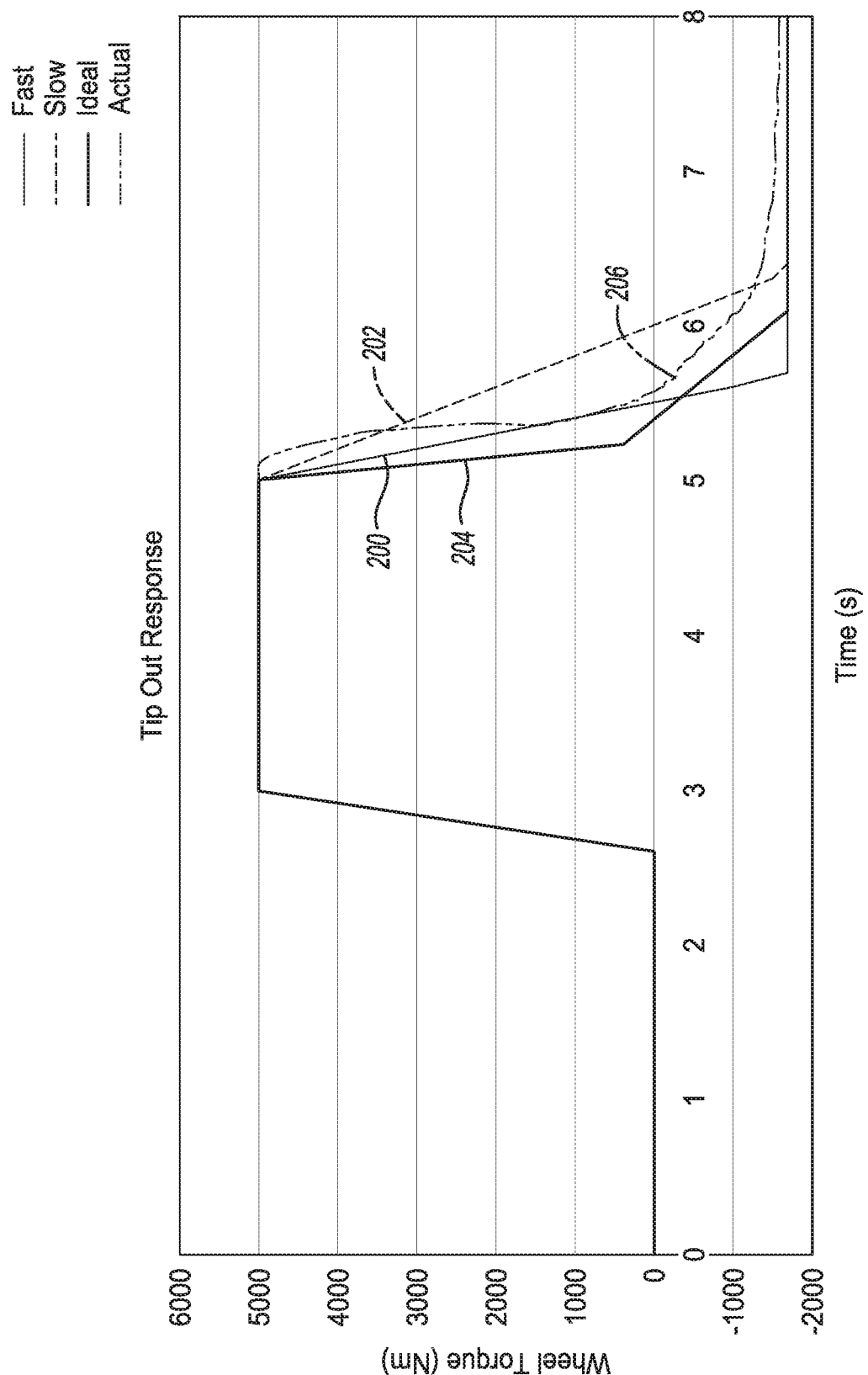

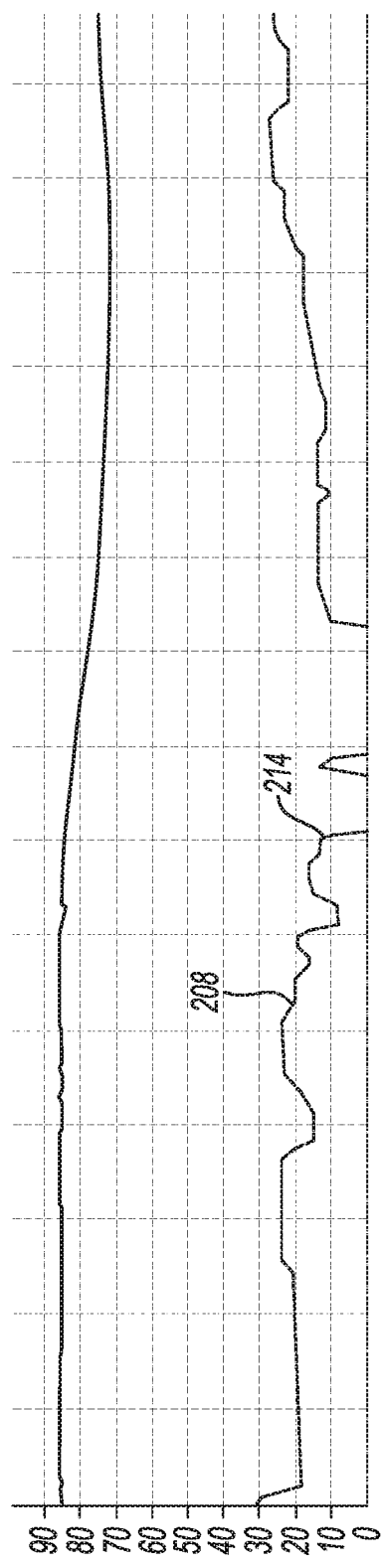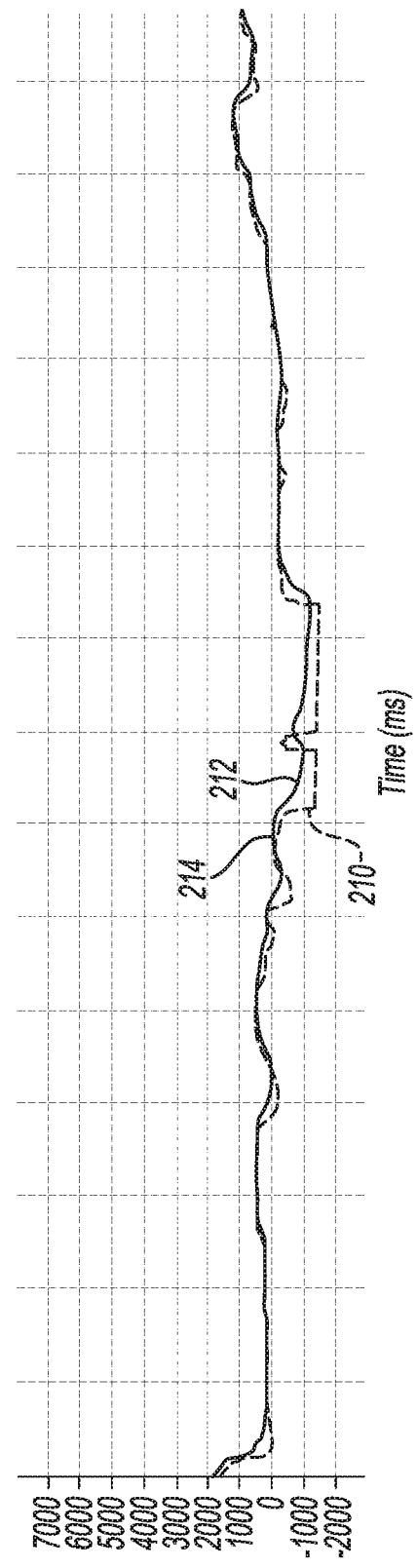

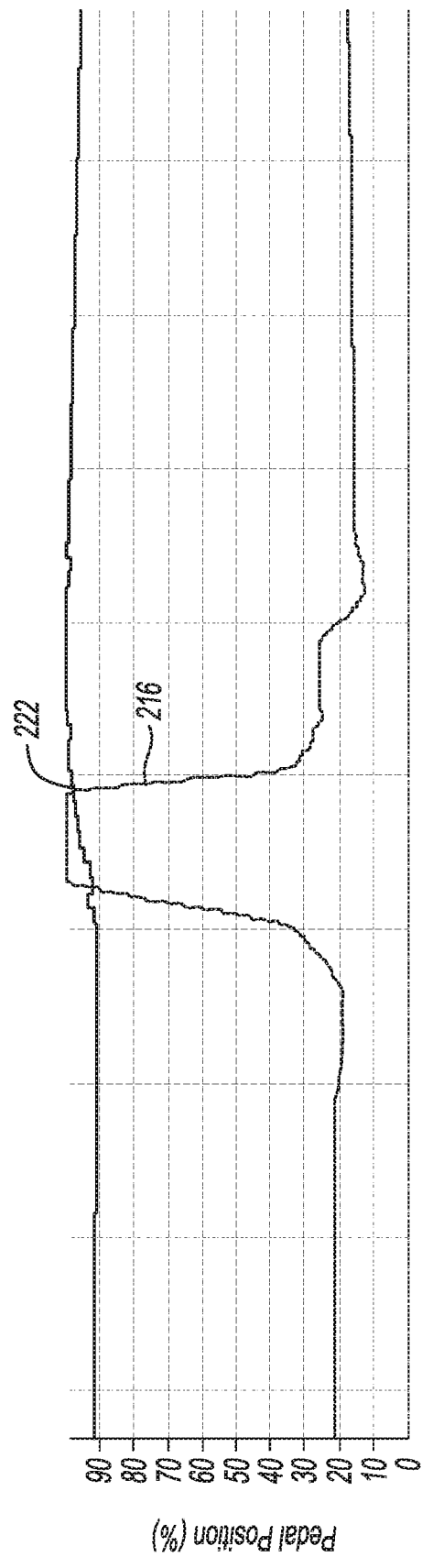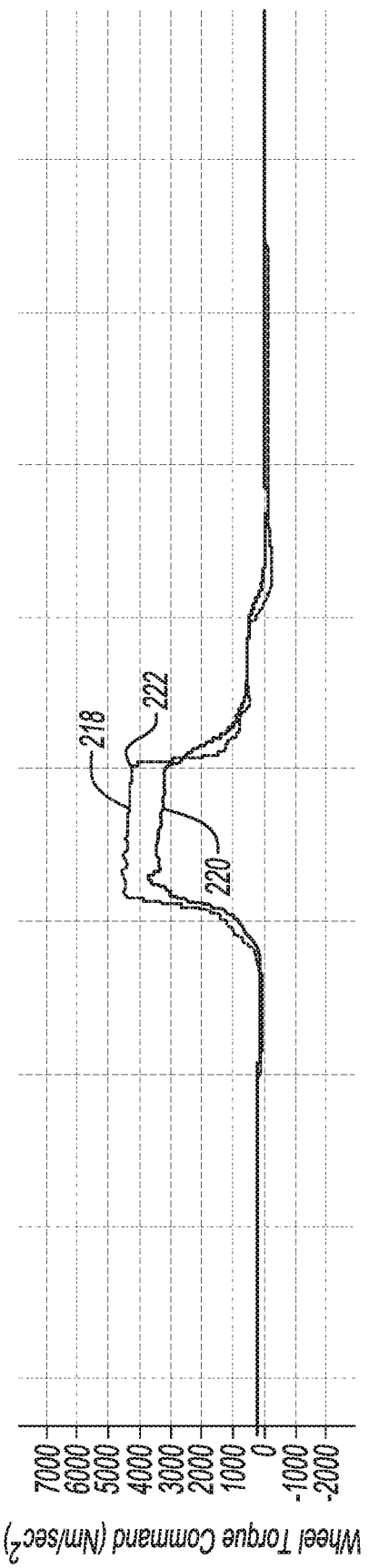

CONTROL OF ACCELERATOR LIFT-PEDAL DECELERATION IN AN ELECTRIC VEHICLE

TECHNICAL FIELD

This disclosure relates to a vehicle, a method, and a control system for limiting the rate of deceleration in an electric vehicle having an electric machine for propelling the vehicle.

BACKGROUND

Vehicles that include an electric machine for propelling the vehicle include hybrid electric vehicles, partial hybrid electric vehicles (including power split and plug-in hybrid types), and battery electric vehicles that are all referred to herein as an electric vehicle or an EV. Electric vehicles may include an electric machine that is configured to provide traction to propel the vehicle and is also configured to convert the kinetic energy of the moving vehicle to recharge the battery of the vehicle.

"Engine braking" refers to a braking force that is applied by an internal combustion engine through the transmission that decelerates the vehicle when a driver tips out from an accelerator pedal. Electric machines used in electric vehicles may provide rapid deceleration when the driver lifts off the accelerator pedal. If the rate of deceleration of the vehicle is excessive, it can cause the vehicle to jerk (rapid rate of change of vehicle deceleration).

This disclosure is directed to solving the above problems and other problems as summarized below.

SUMMARY

When a driver backs off the accelerator pedal partially or fully and does not apply the brake, the rate powertrain torque decreases is a function of the current powertrain torque output and vehicle speed. The rate of deceleration may be rapid when the powertrain torque is relatively great when the driver tips out or backs off the accelerator pedal. Deceleration may be moderately fast when the powertrain torque is positive and the torque is reduced. Deceleration is slow when the powertrain torque is below zero (e.g. when charging the battery). Generally, deceleration is slightly slower at low vehicle speeds and faster at higher vehicle speeds.

The following are examples of acceptable deceleration aver time:
- a tip out from high positive acceleration to a low positive acceleration requires a fast and responsive deceleration rate.
- a tip out from high positive acceleration to lift pedal requires quickly removing the acceleration and comfortably introducing deceleration.
- a tip out from near zero acceleration to lift pedal requires gradual introduction of the deceleration.

According to one feature of this disclosure, a three-dimensional calibration table programmed with a dataset is used to quickly remove positive acceleration and comfortably introduce deceleration. A base table may be provided for normal driving. Different tables may be used to provide more aggressive deceleration in a sports driving mode or less aggressive deceleration in a comfort mode. A vehicle may be provided with the option of selectively switching between modes.

If a driver presses the brake pedal and the requested brake pedal torque is above a calibratable amount, the system controller will not limit the negative torque rate. The rate, instead, will be governed by the brake pedal torque limiter to allow for a faster braking response.

According to one aspect of this disclosure, a vehicle is disclosed that comprises a controller programmed to generate a command to an electric machine to reduce the torque output rate after an accelerator pedal is tipped-out based upon a vehicle speed value and a wheel acceleration torque value. The torque output rate is initially reduced at a first rate, and is substantially reduced at a second rate less than the first rate, when the wheel acceleration torque value is greater than 0 Nm. The controller is enabled to repeat reducing the torque output rate with the second torque output rate becoming the first output rate in a subsequent reduction. The command to reduce torque output may be repeated, as necessary, during the entire deceleration phase when there are positive and negative torque values.

The deceleration rate can be continuously; or repeatedly, changed from a high rate when the wheel torque goes from high positive values to a lower rate. The wheel torque output rate is decreased from a high output rate to a lower output rate as the rate approached zero and crosses into negative values.

In one example, the vehicle may reduce the torque output rate at the second rate when the wheel acceleration torque value is between 1,000 Nm and 0 Nm. The torque output rate may be adjusted at other wheel acceleration torque values. The vehicle speed value may be correlated with the wheel acceleration torque value by the controller to modulate the torque output rate. The controller may reference a look-up table or a stored three-dimensional calibration table to correlate the vehicle speed value with the wheel acceleration torque value to set the rate of deceleration. A brake pedal engagement switch may provide a signal to the controller to override the command to the electric machine when a brake pedal is engaged after the accelerator pedal is tipped-out.

According to another aspect of this disclosure, a method is disclosed for controlling deceleration of an electric vehicle. The method includes using a controller programmed with a data table to command an electric machine. The controller is provided with position data indicating that an accelerator pedal is in a tip-out position, a vehicle speed value when the accelerator pedal is in the tip-out position, and a wheel acceleration torque value when the accelerator pedal is in the tip-out position. The electric machine is commanded to reduce a torque output rate initially at a first rate based upon the data table; and wherein the torque output rate is reduced at a second rate less than the first rate based upon the data table. Additional reductions of the torque output rate can be achieved by repeating the process.

An additional aspect of this disclosure relates to a system for controlling a rate of deceleration of a vehicle. The system includes a controller programmed with a data table including a plurality of vehicle speed data and a plurality of wheel acceleration torque data. The torque output rate of an electric machine is controlled as a function of the vehicle speed data and the wheel acceleration torque data. Inputs to the system comprise a vehicle speed indicator providing a speed value to the controller, a wheel acceleration torque indicator providing a wheel acceleration torque value to the controller, and an accelerator pedal position indicator that provides a signal to the controller when an accelerator pedal is in a tip-out position. The controller provides a command to the electric machine that propels the vehicle to set the torque output rate of the electric machine when the accelerator pedal is in the tip-out position.

The above aspects of this disclosure and other aspects will be described below with reference to the attached drawings.

BRIEF DESCRIPTION OF THE DRAWINGS

FIG. 2 is a diagrammatic graph of wheel torque over time when an accelerator tip-out event occurs comparing a fast torque rate reduction, a slow torque rate reduction to the two-stage torque rate reduction according to one example of this disclosure. An estimated trace of the actual torque response to the two-stage torque rate reduction is also provided.

FIGS. 3 and 4 are two graphs of a slow rate limit applied at a tip-out from road load with FIG. 3 showing when the accelerator pedal is tipped out. FIG. 4 shows the unfiltered driver demand request in response to the tip-out in FIG. 3 and the gradual torque rate limit for reaching the driver demand.

FIGS. 5 and 6 are two graphs of a fast rate limit applied at a tip-out from an wide open acceleration with FIG. 5 showing when the accelerator pedal is tipped out. FIG. 6 shows the unfiltered driver demand request in response to the tip-out in FIG. 3 and the fast torque rate limit for reaching the driver demand.

FIG. 8 shows the unfiltered driver demand request in response to the tip-out in FIG. 7 and a fast torque rate limit for reaching the driver demand when the brake is applied.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale, and some features may be exaggerated or minimized to show details of particular components. The specific structural and functional details disclosed are not to be interpreted as limiting, but as a representative basis for teaching one skilled in the art how to practice the disclosed concepts.

Embodiments of the present disclosure are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to use the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure could be incorporated in particular applications or implementations.

Figure 1:
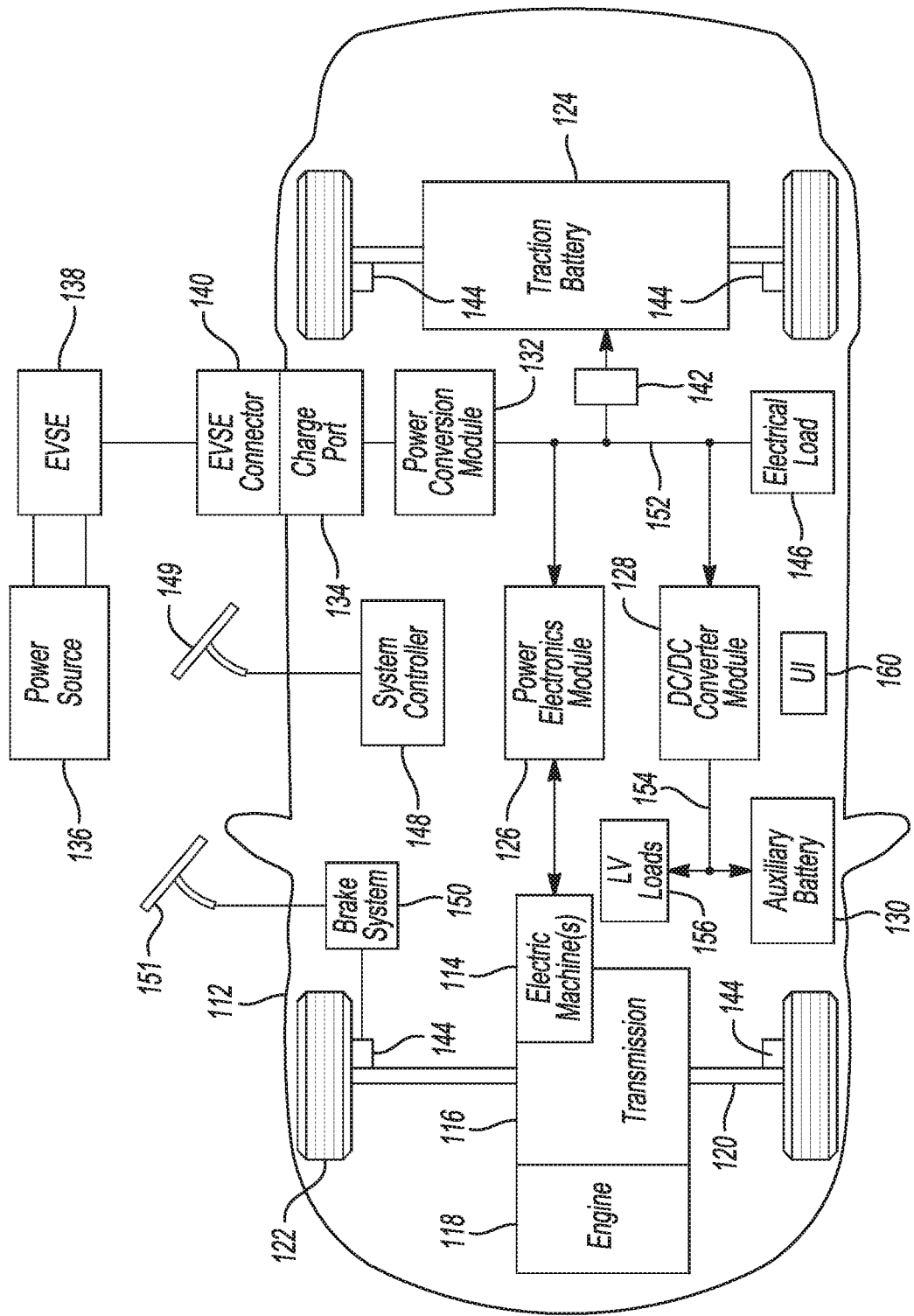
FIG. 1 is a diagram of an electric vehicle illustrating typical drivetrain and energy storage components.

FIG. 1 depicts one example of an electric vehicle (EV) 112 that is a plug-in hybrid-electric vehicle (PHEV). Alternatively, the EV may be a partial hybrid vehicle or a plug-in electric vehicle, a battery electric vehicle, or other vehicles using an electric machine 114 for propulsion. A plug-in hybrid-electric vehicle 112 may comprise one or more electric machines 114 mechanically coupled to a gearbox or hybrid transmission 116. The electric machines 114 may be capable of operating as a motor and a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and regenerative braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. The electric vehicle 112 may also be a battery electric vehicle (BEV). In a. BEV configuration, the engine 118 may not be present. In other configurations, the electric vehicle 112 may be a full hybrid-electric vehicle (FHEV) without plug-in capability.

A battery pack or traction battery 124 stores energy that can be used by the electric machines 114. The traction battery 124 may provide a high voltage direct current (DC) output. A contactor module 142 may include one or more contactors configured to isolate the traction battery 124 from a high-voltage bus 152 when opened and connect the traction battery 124 to the high-voltage bus 152 when closed. The high-voltage bus 152 may include power and return conductors for carrying current over the high-voltage bus 152. The contactor module 142 may be located in the traction battery 124. One or more power electronics modules 126 (also known as an inverter) may be electrically coupled to the high-voltage bus 152. The power electronics modules 126 are also electrically coupled to the electric machines 114 and provide the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

In addition to providing energy for propulsion, the traction battery 124 may provide energy for other vehicle electrical systems. The vehicle 112 may include a DC/DC converter module 128 that converts the high voltage DC output from the high-voltage bus 152 to a low-voltage DC level of a low-voltage bus 154 that is compatible with low-voltage loads 156. An output of the DC/DC converter module 128 may be electrically coupled to an auxiliary battery 130 (e.g., 12V battery) for charging the auxiliary battery 130. The low-voltage loads 156 may be electrically coupled to the auxiliary battery 130 via the low-voltage bus 154. One or more high-voltage electrical loads 146 may be coupled to the high-voltage bus 152. The high-voltage electrical loads 146 may have an associated controller that operates and controls the high-voltage electrical loads 146 when appropriate. Examples of high-voltage electrical loads 146 may be a fan, an electric heating element and/or an air-conditioning compressor.

The electric vehicle 112 may be configured to recharge the traction battery 124 from an external power source 136. The external power source 136 may be a connection to an electrical outlet. The external power source 136 may be electrically coupled to a charge station or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for coupling to a charge port 134 of the vehicle 112. The charge port 134 may be any type of port configured to transfer power from the EVSE 138 to the vehicle 112. The charge port 134 may be electrically coupled to an on-board power conversion module or charger. The charger 132 may condition the power supplied from the EVSE 138 to provide the proper voltage and current levels to the traction battery 124 and the high-voltage bus 152. The charger 132 may be electrically coupled to the contactor module 142. The charger 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

Wheel brakes 144 may be provided for braking the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144. The brake system 150 may respond to driver commands from a brake pedal 151 or may also operate autonomously to implement features such as stability control. The controller of the brake system 150 may implement a method of applying a requested brake force when requested by another controller or sub-function.

The electric vehicle 112 may further include a user interface 160. The user interface 160 may provide a variety of display elements for communicating information to the operator. The user interface 160 may provide a variety of input elements for receiving information from the operator. The user interface 160 include one or more displays. The displays may be touch-screen displays. The user interface 160 may include discrete lamps/lights. For example, the lamps may include light-emitting diodes (LED). The user interface 160 may include switches, rotary knobs, and buttons for allowing the operator to change various settings. The user interface 160 may include a control module that communicates via the vehicle network. The user interface 160 may provide one or more display elements that are configured to identify diagnostic conditions. The display elements may include discrete lamps and/or messages in a message display area.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1, but it may be implied that the vehicle network may connect to any electronic modules that are present in the vehicle 112, A vehicle system controller (VSC) 148 may be present to coordinate the operation of the various components. The VSC 148 receives torque level requests from a driver through an accelerator pedal 149.

The electric vehicle may include a number of controllers that communicate via a communication bus. The communication may be defined by a communication protocol. The communication protocol may define the message content and timing. Further, the communication protocol may define possible responses to various messages or message content. The communication protocol may define message addressing between senders and receivers. For example, each controller communicating via the bus may be assigned a unique identifier so that messages may be sent individually to each controller. In other examples, messages may be assigned an identifier and be broadcast on the communication bus for all controllers to receive.

Referring to FIG. 2, a graph is provided that compares the wheel torque command over time to a fast deceleration rate by line 200, a slow deceleration rate by line 202 and one example of a two-stage deceleration rate in accordance with this disclosure by line 204. With a fast deceleration rate (<−4 m/s/s), a vehicle is subject to jerking as the vehicle approaches a commanded negative wheel torque level. Tip-out from a positive wheel torque of 5,000 Nm is rapidly reduced until a wheel torque of −1,800 Nm is obtained. With a slow deceleration rate (0 to −2 m/s/s), a vehicle more smoothly transitions to the commanded negative wheel torque. Tip-out from a positive wheel torque of 5,000 Nm is more slowly reduced compared to the fast deceleration rate until a wheel torque of −1,800 Nm is obtained. Slower deceleration results in reduced energy efficiency caused by reduced braking regeneration.

For example, a two-stage deceleration rate shown in the illustrated example initially commands fast deceleration at a rate of <−4 Nm/s/s. While the wheel torque is greater than 0 Nm, the deceleration rate is commanded to change to a slower deceleration rate of 0 to −2 Nm/s/s. Tip-out from a positive wheel torque of 5,000 Nm is rapidly reduced until a wheel torque of 400 Nm is obtained, then a slower deceleration rate is commanded until a wheel torque of −1,800 Nm is obtained. While the illustration is of the two-stage deceleration rate, additional embodiments of the invention may include a three or more-stage system or a system wherein the deceleration rate is continuously adjusted to progressively slower rates. In the illustrated example, the first rate may be set initially and then changed to a second and lower rate of deceleration.

The torque rate required to deliver a given deceleration depends upon vehicle weight and road loads (towing load, road inclination, and the like).

FIG. 2 also illustrates an estimated actual wheel torque by the line 206 when the vehicle is using the illustrated example of the two-stage deceleration rate. Multiple deceleration rate changes may be made by the system to further smooth the deceleration process. The actual wheel torque lags the commanded two-stage deceleration line 204. With this approach, rapid deceleration may be achieved that improves energy efficiency and while minimizing jerking motion by reducing the deceleration rates.

Referring to FIGS. 3 and 4, an example of a slow rate limit applied at tip out from road load is illustrated with the FIG. 3 showing the percent accelerator pedal position by line 208. FIG. 4 shows the unfiltered driver demand request by line 210 and the resultant gradual torque rate limit by line 212 required to meet the driver torque demand. At point 214 (tip-out) the actual torque rate is shown to lag the unfiltered driver demand request. The accelerator torque request immediately drops when the driver tips-out from the accelerator pedal, but the rate is limited to a slow rate.

Referring to FIGS. 5 and 6, an example of a fast rate limit applied at tip out from wide open accelerator pedal position is illustrated with FIG. 5 showing the percent pedal position by line 216 and FIG. 6 showing the unfiltered driver demand request by line 218 and the resultant gradual torque rate limit by line 220 required to meet the driver torque demand. At point 222 the actual torque rate is shown to lag the unfiltered driver demand request. The accelerator torque request immediately drops when the driver tips-out from the accelerator pedal but the rate is limited to a fast rate.

Figure 7:
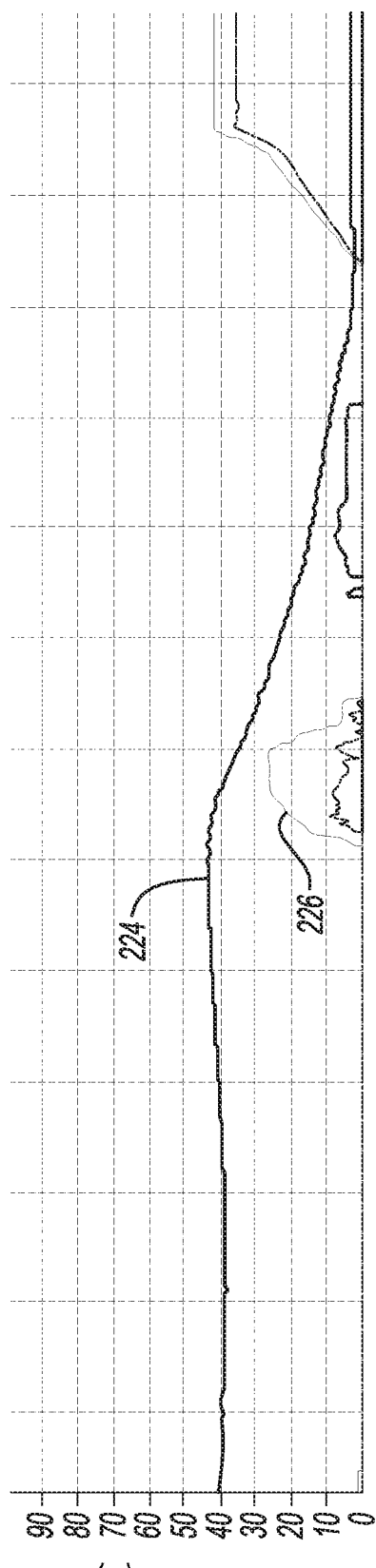
FIGS. 7 and 8 are two graphs of a fast rate limit applied at a tip-out when the brake pedal is contacted with FIG. 7 showing when the accelerator pedal is tipped out and the brake is applied.
Figure 8:
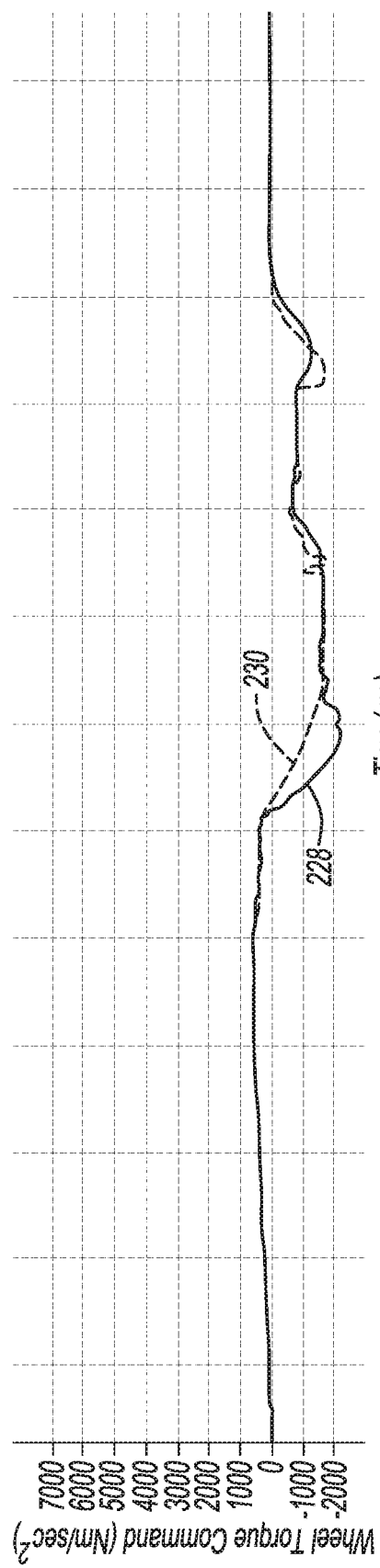

Referring to FIGS. 7 and 8, an example of a two-stage deceleration rate system is illustrated when the accelerator pedal is tipped out and the brake pedal is contacted. In FIG. 7, the accelerator pedal position is shown by line 224 and the brake pedal applied line is labelled 226 When the brake pedal is contacted, the two-stage deceleration system is overridden and the faster torque rate limit shown by line 228 in FIG. 8 is applied. The unfiltered driver demand request is also shown in FIG. 8 by line 230. The two-stage system maximizes energy efficiency and maximizes the braking force from both the friction brakes and the braking effect of the regenerating system.

Figure 9:
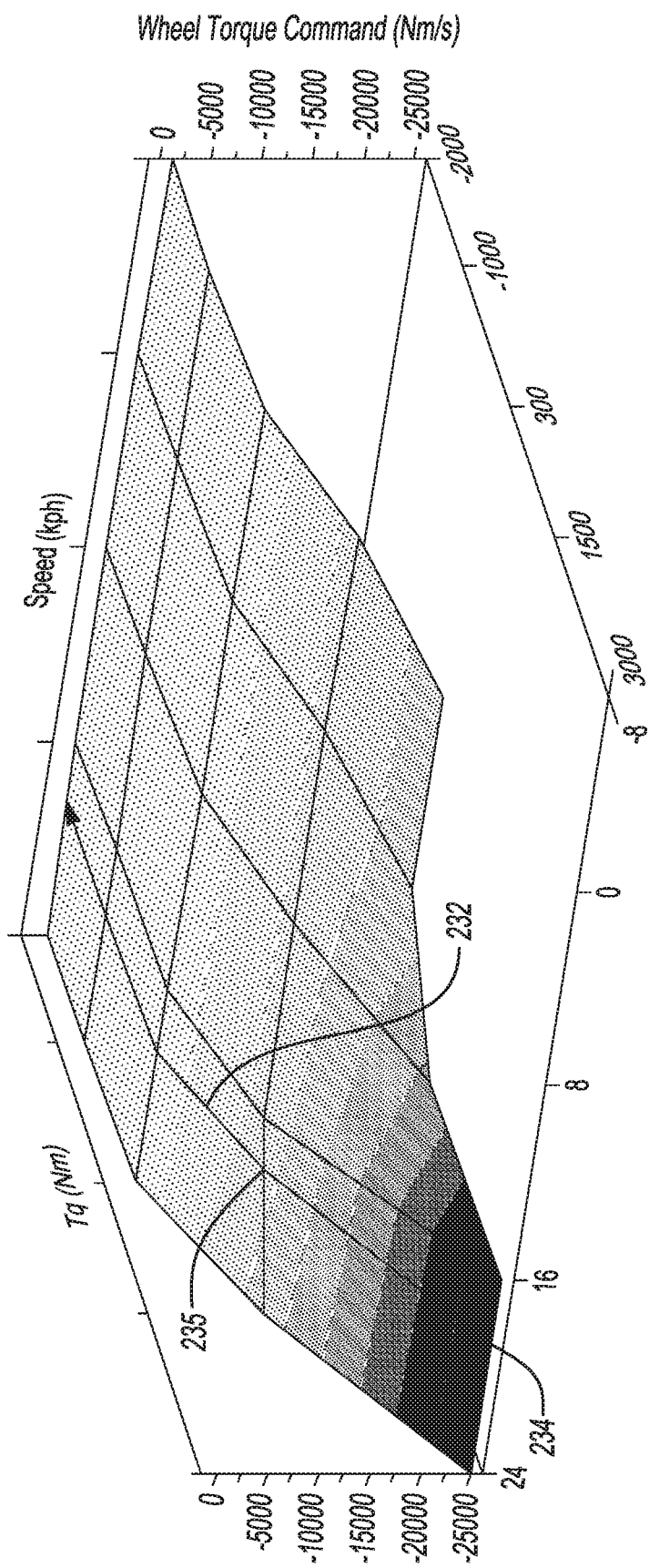
FIG. 9 is a three-dimensional graph of the wheel torque command as a function of vehicle speed and acceleration torque at the wheels of the vehicle.

Referring to FIG. 9, a three-dimensional calibration table programmed with a dataset is provided to show vehicle speed vs. acceleration torque at the wheels that is used to set a deceleration rate command. Line 232 illustrates one example of values of the acceleration torque at the wheels and the rates of deceleration at a selected vehicle speed. For example, at point 234 the vehicle has a speed of about 21 kph with an acceleration torque at the wheels of 3,000 Nm the wheel torque command is −25,000 Nm/s/s. As the torque at the wheels is about 2,000 Nm is further reduced to the point at 235 by the torque command to −7,000 Nm/s/s. The process may be repeated to add multiple stages of deceleration rates along the line 236. The three-dimensional calibration table programmed with a dataset of FIG. 9 is one example of a calibration. The calibration can be set to a selected driving mode (e.g. normal, sport, or economy). Other calibrations can be used or a look-up table of stored values for speed and acceleration torque at the wheels may be used to arrive at a wheel torque command.

Figure 10:
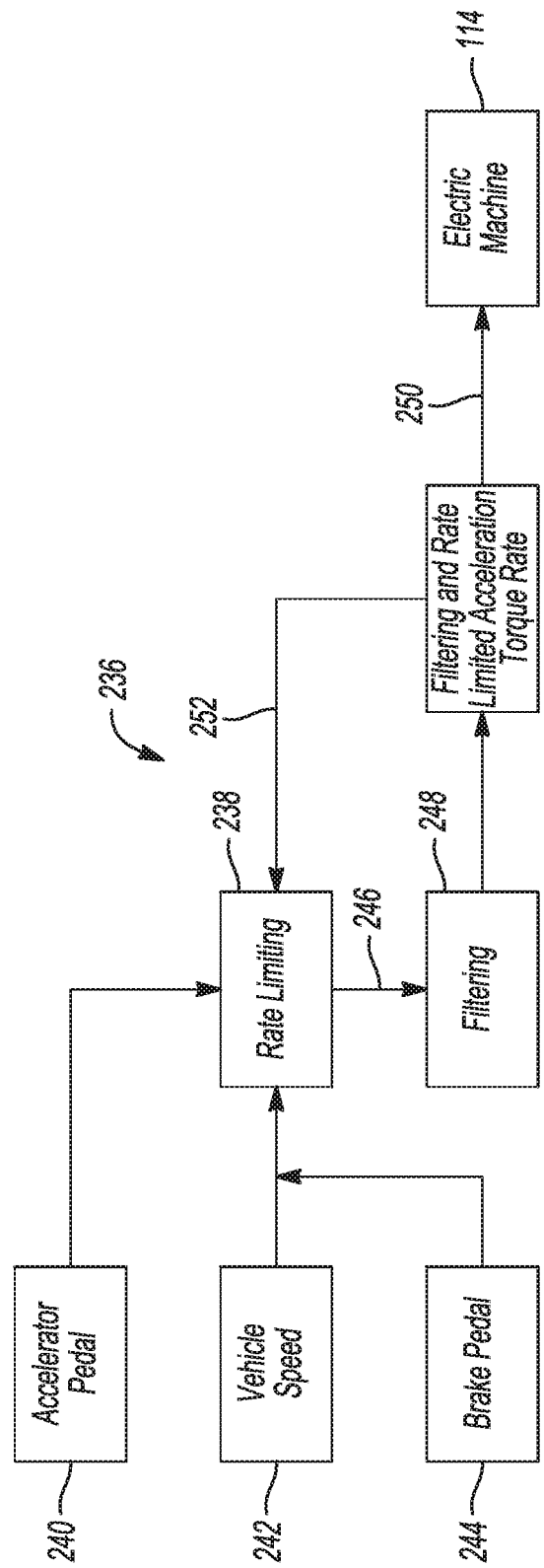
FIG. 10 is a flowchart showing the use of the vehicle speed, accelerator pedal torque and braking torque request inputs to the two-stage rate limiting and filtering processing steps.

Referring to FIG. 10, a simplified flowchart of the disclosed deceleration rate limiting system is illustrated, at 236. The rate limiting system 238 receives inputs from the accelerator pedal 240, the vehicle speed 242, and a brake pedal 244. The rate limiting system accesses a three-dimensional calibration table programmed with a dataset (e.g. FIG. 9) or a look-up table of stored values to generate a deceleration rate limit signal 246 that is then filtered at 248 before the filtered and rate limited accelerator torque signal 250 is provided to the electric machine 114. Substantially continuous adjustment of the accelerator torque signal may be obtained by sending the accelerator torque signal back to the rate limiting system on line 252 and results in a recalculation of the decelerating torque command.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and includes modifications of the illustrated embodiments.

What is claimed is:

1. A method of controlling deceleration of an electric vehicle comprising:
   providing a controller that is programmed with a data table to command an electric motor;
   providing the controller with position data indicating that an accelerator pedal is in a tip-out position;
   providing the controller with wheel torque data;
   providing the controller with vehicle speed data when the accelerator pedal is in the tip-out position, wherein the controller generates a first deceleration rate value based upon the wheel torque data, the vehicle speed data, and the data table;
   commanding the electric motor based on the first deceleration rate value to set a first wheel torque output rate for a first time period;
   providing the controller with the wheel torque data, and the vehicle speed data after the first time period with the accelerator pedal in the tip-out position, wherein the controller generates a second deceleration rate value based upon the wheel torque data, the vehicle speed data, and the data table; and
   commanding the electric motor based on the second deceleration rate value to set a second wheel torque output rate for a second time period, wherein the second wheel torque output rate is less than the first wheel torque output rate.

2. The method of controlling deceleration of the electric vehicle of claim 1 further comprising:
   providing the controller with wheel torque data;
   providing the controller with vehicle speed data after the second time period with the accelerator pedal in the tip-out position, wherein the controller generates a third deceleration rate value based upon the wheel torque data, the vehicle speed data, and the data table; and
   commanding the electric motor based on the third deceleration rate value to set a third wheel torque output rate for a third time period, wherein the third wheel torque output rate is less than the second wheel torque output rate.

3. The method of controlling deceleration of the electric vehicle of claim 1 wherein the data table is a three-dimensional calibration table programmed with wheel torque values, and vehicle speed values; wherein the controller generates one of the first deceleration rate, and the second deceleration rate based upon the wheel torque data, and the vehicle speed data.

4. A system for controlling a rate of deceleration of a vehicle comprising:
   a vehicle speed indicator providing vehicle speed data;
   a wheel torque indicator providing a wheel torque value;
   a controller programmed with a data table including the vehicle speed data, and wheel torque data, wherein when an accelerator pedal is in a tip-out position the controller generates a first deceleration rate value based upon the wheel torque data, the vehicle speed data, and the data table;
   commanding an electric motor based on the first deceleration rate value to set a first wheel torque output rate for a first time period;
   providing the controller with the wheel torque data, and the vehicle speed data after the first time period with the accelerator pedal in the tip-out position, wherein the controller generates a second deceleration rate value based upon the wheel torque data, the vehicle speed data, and the data table; and
   commanding the electric motor based on the second deceleration rate value to set a second wheel torque output rate for a second time period, wherein the second wheel torque output rate is less than the first wheel torque output rate.

5. The system for controlling the rate of deceleration of the vehicle of claim 4 wherein the first torque output rate is reduced at a second torque output rate less than the first torque output rate when the wheel torque value is greater than 0 Nm.

6. The system for controlling the rate of deceleration of the vehicle of claim 4 further comprising:
   a brake pedal engagement switch that provides a brake braking signal to the controller to override commanding the electric motor when a brake pedal is engaged after the accelerator pedal is in the tip-out position.

7. The system for controlling the rate of deceleration of the vehicle of claim 4 further comprising:
   providing the controller with wheel torque data;
   providing the controller with vehicle speed data after the second time period with the accelerator pedal in the tip-out position, wherein the controller generates a third deceleration rate value based upon the wheel torque data, the vehicle speed data, and the data table; and
   commanding the electric motor based on the third deceleration rate value to set a third wheel torque output rate for a third time period, wherein the third wheel torque output rate is less than the second wheel torque output rate.

8. The system for controlling the rate of deceleration of the vehicle of claim 4 wherein the data table is a three-dimensional calibration table programmed with wheel torque values, and vehicle speed values, wherein the controller generates one of the first deceleration rate, and the second deceleration rate based upon the wheel torque data, and the vehicle speed data.

* * * * *